United States Patent [19]

Ethen et al.

[11] Patent Number: 5,381,662

[45] Date of Patent: Jan. 17, 1995

[54] HAND-HELD BLEEDER STROKE TOOL

[75] Inventors: Richard M. Ethen, Litchfield; Timothy P. Connelly, Glenarm, both of Ill.

[73] Assignee: Echlin Inc., Branford, Conn.

[21] Appl. No.: 145,783

[22] Filed: Oct. 29, 1993

[51] Int. Cl.6 ............................. B60T 11/30; F15B 7/10
[52] U.S. Cl. ......................................... 60/584; 92/13.4
[58] Field of Search ...................... 60/325, 584; 92/79, 92/13, 13.4, 13.41

[56] References Cited

U.S. PATENT DOCUMENTS

| | | | |
|---|---|---|---|
| 2,817,955 | 12/1957 | Mercier | 60/584 |
| 2,819,934 | 1/1958 | Luterick | 92/13.4 |
| 4,091,969 | 5/1978 | Easter et al. | 92/13.4 X |
| 4,497,176 | 2/1985 | Rubin et al. | 60/584 |
| 4,635,442 | 1/1987 | Bass | 60/584 X |
| 4,686,870 | 8/1987 | Mack | 92/13.4 X |
| 4,800,725 | 1/1982 | Kaulig et al. | |
| 5,050,381 | 9/1991 | Matsuno et al. | 60/584 |

*Primary Examiner*—Edward K. Look
*Assistant Examiner*—Hoang Nguyen
*Attorney, Agent, or Firm*—Arnold, White & Durkee

[57] ABSTRACT

A hand-held bleeder stroke tool for bleeding gas from a cylinder/piston assembly, such as a vehicle master brake cylinder assembly. The present invention utilizes a rod with a push member at one end of the rod. The push member is generally spherical and contacts the piston of the assembly to force or stroke the piston into the cylinder and forcing the gas from the cylinder. At an end generally opposed to the push member, the rod is secured to a handle to provide effective gripping. Furthermore, the present invention utilizes a stroke indicator assembly comprising a slider movably mounted to the rod as well as length markings on the rod as visual gauging features for determining equal length strokes of the piston.

6 Claims, 2 Drawing Sheets

HAND-HELD BLEEDER STROKE TOOL

FIELD OF THE INVENTION

The present invention generally relates to a tool for bleeding gas from a cylinder/piston assembly. More particularly, the present invention relates to a hand-held bleeder stroke tool for manually bleeding gas from a cylinder/piston assembly, such as a vehicle master brake cylinder assembly.

BACKGROUND OF THE INVENTION

Certain cylinder/piston assemblies must be purged of any gas entrapped within in order to operate effectively. For example, a vehicle master brake cylinder must be purged of any entrapped gas in order for the braking system of a vehicle to operate in an effective and safe manner. Typically, a vehicle master brake cylinder comprises a housing having an interior cylinder, a primary piston movably mounted within the cylinder, and a brake fluid reservoir containing brake fluid in communication with the cylinder to keep the cylinder filled with brake fluid.

Various apparatus exist for purging or bleeding gas from cylinder/piston assemblies, but these apparatus suffer from certain drawbacks. For instance, these bleeding apparatus are complex, bulky and costly. Consequently, they are difficult and awkward to operate and require an inordinate amount of servicing. Moreover, these previous bleeding apparatus are unreliable in properly bleeding the gas from the cylinder/piston assembly.

One known bleeding apparatus comprises a support means upon which the cylinder/piston assembly is mounted for bleeding and adjacent to the support means a pivotally mounted lever that is connected to a push rod. By pulling down on the lever, the push rod engages the primary piston through an access opening and pushes the piston into the cylinder, thereby forcing entrapped gas from the cylinder.

This bleeding apparatus, although an improvement over earlier bleeding apparatus, remains bulky, costly and inconvenient particularly when an uncommon cylinder/piston assembly is being bled because the support means will not readily support the uncommon assembly. Moreover, the push rod of this known bleeding apparatus requires realignment when used with an uncommon cylinder/piston assembly since the push rod will not line up with the primary piston of the cylinder/piston assembly. Furthermore, this apparatus is susceptible to over stroking or under stroking the piston. Over stroking in bleeding a cylinder can cause damage to piston seals and allow leaking of fluid from the cylinder/piston assembly, and under stroking can lead to the ineffective or inefficient bleeding of gas from the cylinder. Thus, there is a need for a bleeder tool that is inexpensive, flexible, efficient and effectively bleeds air from any cylinder/piston assemblies.

SUMMARY OF THE INVENTION

The hand-held bleeder stroke tool of the present invention is easy to operate and inexpensive to manufacture. In operation, the tool simply, flexibly and inexpensively bleeds gas from any cylinder/piston assembly without requiring any special realignment for uncommon assemblies and reduces the possibility of damage to the piston from a sharp point contact. Complicated realignment of the push rod for use with uncommon cylinder/piston assemblies is unnecessary because the bleeder stroke tool is hand-held and the orientation of a secured cylinder/piston assembly is unimportant provided the bleeder stroke tool has access to the primary piston of the cylinder/piston assembly.

The hand-held bleeder stroke tool of the present invention includes a rod having a first and second end, a handle secured to the second end, a push member at the first end and a stroke indicator assembly. It is desirable to control the stroke lengths when bench bleeding master cylinders to prevent over stroking or under stroking of the piston. Accordingly, the stroke indicator assembly includes a slider moveably mounted on the push rod to provide a visual means to consistently determine the stroke length and a slider securing means to maintain the position of the slider on the push rod during piston stroking. Additionally, the stroke indicator assembly comprises a plurality of grooves, etched lines or other suitable markings on the rod designating stroke length settings. The slider is used in conjunction with the grooves or markings on the push rod to provide a visual gauging feature for determining proper and equal length strokes of the primary piston. The markings or grooves can represent predetermined stroke lengths for cylinder/piston assemblies or designate measurement length settings from the tip of the push member. Thus, the position of the grooves or markings on the rod is a matter of design choice.

In operation, the user of the bleeder stroke tool orients the rod so that the push member contacts the primary piston of a secured cylinder/piston assembly. The user of the bleeder stroke tool then forces the piston into the cylinder by applying a force to the piston using the push member of the rod. The push member is preferably spherical in shape to evenly distribute the applied forces required to stroke the primary piston. The user strokes the piston with consistently equal stroke lengths by use of the stroke indicator assembly to prevent over stroking and understroking of the piston.

The user strokes the piston using the proper stroke length to prevent over stroking and understroking the piston. To accomplish this, the user determines stroke length by setting the stroke indicator assembly prior to beginning the stroke operation. Specifically, the user moves the slider to a desired stroke length position on the push rod as indicated by the grooves or markings on the push rod. The user strokes the piston according to the position of the slider on the push rod, and the slider securing means maintains the position of the slider during piston stroking. In this way, the user strokes the piston using consistently equal stroke lengths. Usually, several strokes of the piston are required to completely bleed the trapped gas. The number of strokes necessary depends upon the actual situation and can be determined by the users sensitivity to the amount of force needed to move the piston or by continuing the strokes until all bubbles stop appearing in the brake fluid reservoir.

In a preferred embodiment of the present invention, the bleeder stroke tool is used for bench bleeding air entrapped in a master brake assembly prior to installing the cylinder into a vehicle. This tool is used in conjunction with a clamping device, vise or other suitable means for securing the master cylinder in a fixed position. The master cylinder with the bore in a generally horizontal position is oriented to provide access to the primary piston. Even if access to the primary piston is partially obstructed, the hand-held bleeder stroke tool can still bleed the master cylinder assembly by the maneuvering of the bleeder tool to a position where it can effectively access the primary piston. This allows the tool user to hold the bleeder stroke tool and manually pump or stroke the primary piston with consistently equal length strokes using the stroke indicator assembly until gas trapped in the bore is removed.

BRIEF DESCRIPTION OF THE DRAWINGS

The advantages of the present invention will become apparent upon reading the following detailed description and upon reference to the accompanying drawings, in which:

FIG. 4b shows an enlarged view of the fragmented sectional portion within the circle in FIG. 4a.

Figure 1:
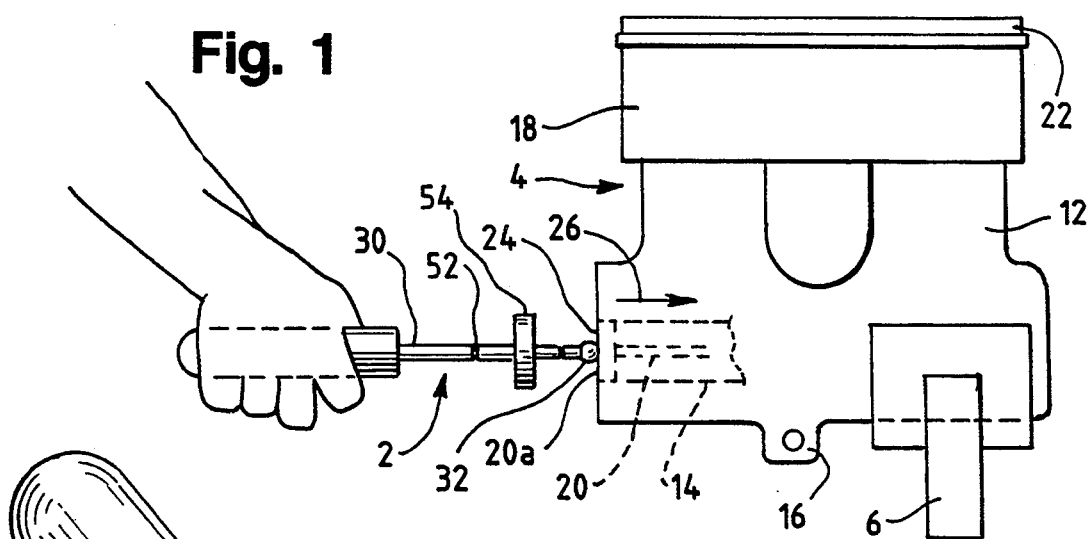
FIG. 1 illustrates the bleeder stroke tool of the present invention acting on a master brake cylinder assembly.

While the invention is susceptible to various modifications and alternative forms, specific embodiments thereof have been shown by way of example in the drawings and will herein be described in detail. It should be understood, however, that it is not intended to limit the invention to the particular forms disclosed. On the contrary, the intention is to cover all modifications, equivalents, and alternatives falling within the spirit and scope of the invention as defined by the appended claims.

DETAILED DESCRIPTION OF THE PREFERRED EMBODIMENT

The bleeder stroke tool is preferably used in bench bleeding air entrapped in a master brake cylinder assembly prior to installing the assembly into a vehicle. FIG. 1 shows the bleeder stroke tool 2 of the present invention acting upon a conventional master brake cylinder assembly 4 of the type used in automobiles and trucks. The brake assembly 4 is shown removed from the vehicle (not shown). The bleeder stroke tool 2 is preferably used in conjunction with a clamping type work bench, vise or other suitable securing means 6 for securing the position of the brake assembly 4.

As is well known, the master brake cylinder assembly 4 includes several basic components which are represented in general for ease in explaining the use of the bleeder stroke tool 2. A housing 12 has an interior cylinder 14 formed therein. An outlet port 16 communicates with the cylinder 14. This outlet port 16 can be opened to drain brake fluid from the master cylinder assembly 4, but prior to the assembly 4 being purged of gas by the bleeder tool 2, the outlet 16 or any other outlet is plugged by conventionally sealing the outlets or connecting the outlets and a brake fluid reservoir 18 with short tubes (not shown). A primary piston 20 is movably mounted within the cylinder 14, and the brake fluid reservoir 18 communicates with the cylinder 14 to keep the cylinder filled with brake fluid, as is well known to those skilled in the field. The reservoir 18 is illustrated with a removable cover 22 to allow the replenishing of the reservoir 18 with brake fluid. Access opening 24 provides access to an end portion 20a of the primary piston 20. The assembly 4 is secured in a position permitting access to the end portion 20a of the primary piston 20. The opposite end portion of piston 20 includes a head (not shown) which slidably and sealingly engages the cylinder wall.

Figure 3:
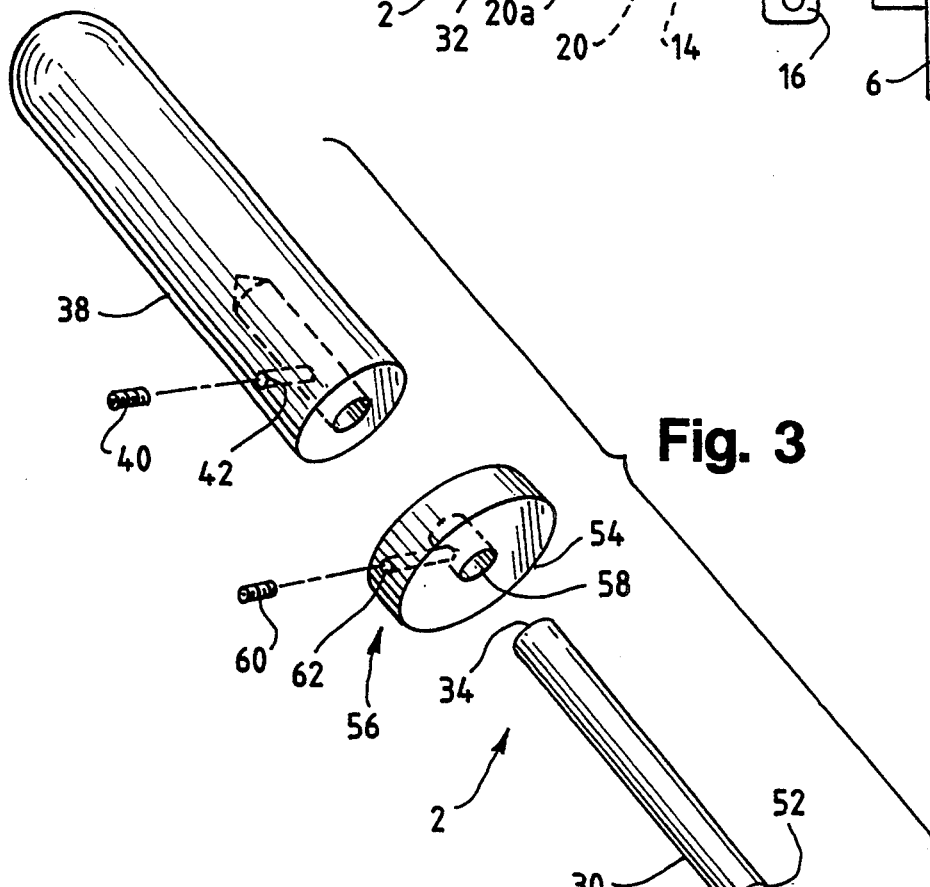
FIG. 3 is an exploded, perspective view of the bleeder stroke tool.
Figure 2:
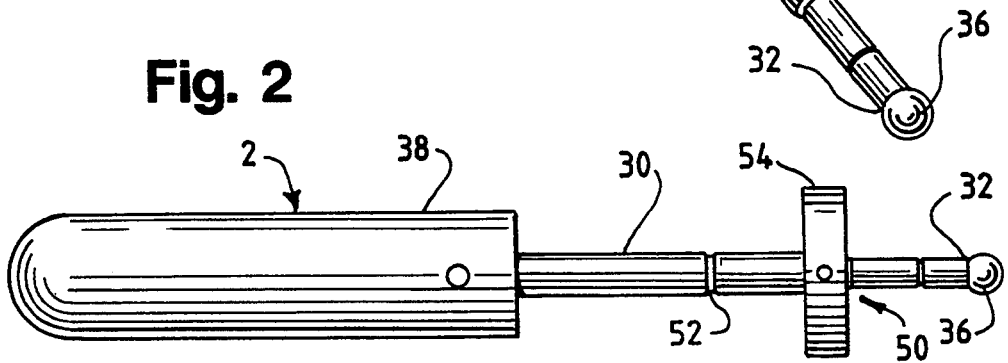
FIG. 2 is a side view of the bleeder stroke tool.
Figure 4A:
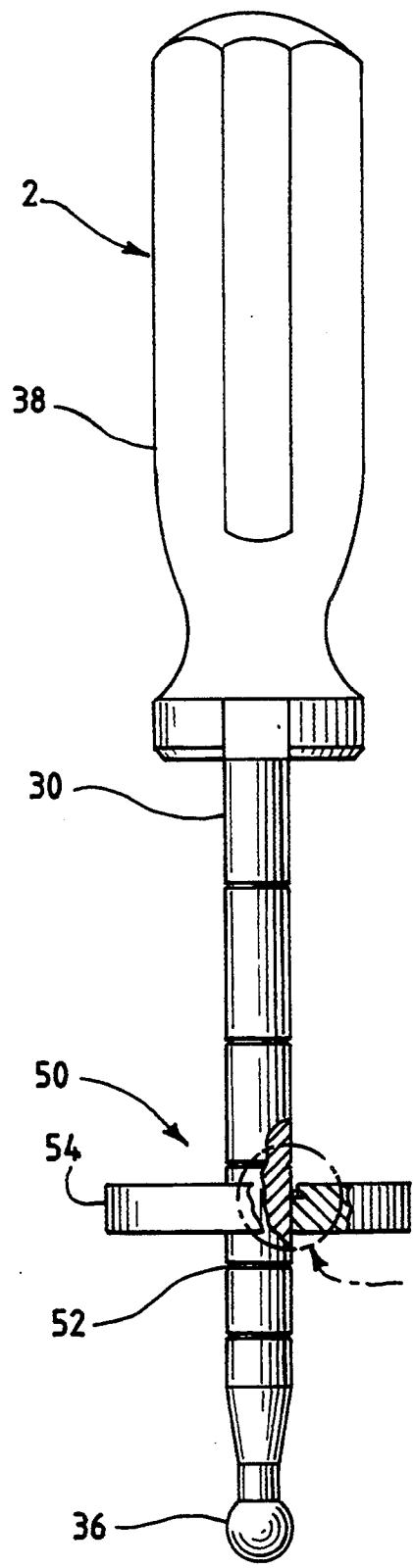
FIG. 4a is a side view of a preferred embodiment of the bleeder stroke tool of the present invention shown with a fragmented sectional portion.

As best seen in FIGS. 2-3, the bleeder stroke tool 2 comprises a rod 30. The rod 30 is preferably made of steel or other material providing suitable strength capabilities. The rod 30 has a first end 32 and a second end 34. A push member 36 is located at the first end 32 of the rod 30. The push member 36 can be integrally formed as part of the rod 30 or separately secured to the rod 30. The push member 36 is preferably shaped as a sphere. However, other geometric shapes that do not have sharp edges or corners could also be used. A handle 38 is secured to the second end 34 of rod 30. The handle 38 is preferably made of aluminum, plastic or other suitable material proportioned so as to provide a comfortable grip in the tool user's hand. The handle 38 can be secured to the push rod 30 mechanically by a fastener, crimped and press fit or by the handle 38 being molded to the push rod 30. As illustrated in FIG. 3, a tap screw 40 secures the handle 38 to the push rod 30 through a tap screw channel 42 in the handle 38. Alternatively, as shown in FIG. 4a, the handle 38 is molded to the push rod 30.

In operation, the user of the bleeder tool 2 grasps the handle 38 and, through the access opening 24, engages the end portion 20a of the primary piston 20 with the push member 36. The tool user applies a force to the primary piston 20 in the direction of arrow 26 to force the piston 20 into the cylinder 14. The push member 36 is preferably spherically shaped to evenly distribute the applied forces and eliminate the possibility of damaging the primary piston 20 with a sharp point contact. Alternatively, the push member 36 can have other geometric shapes such as a shape reflecting the contour of the end portion 20a of the primary piston 20. Consequently, the shape of the push member 36 coincides with the need to evenly distribute the applied forces from the push member 36 to the end portion 20a and to reduce the possibility of damage to the primary piston 20 with a sharp point contact.

The bleeder tool user manually pumps or strokes the primary piston 20 expelling gas trapped within the assembly 4 through the brake fluid reservoir 18. The tool user strokes the primary piston 20 until bubbles stop appearing in the reservoir 18. In bench bleeding the master brake cylinder assembly 4, it is desirable to stroke the primary piston 20 with steady and equal length stokes. Accordingly, the bleeder stroke tool 2 comprises a stroke indicator assembly 50 including grooves, etched lines or other suitable markings 52 on the rod 30 to visually provide stroke length settings to the tool user. The lengths of the grooves 52 from the push member 36 are established at intervals to cover ranges of piston strokes for typical master brake cylinder assemblies. As would be understood by one of ordinary skill in the art, the position of the grooves 52 can be varied to meet design considerations or simply represent a numerical gradation. These set positions are established to prevent over stroking and understroking of the piston. Over stroking in bleeding a cylinder can cause damage to the piston cup seals and allow leakage. This results in the appearance of a defective cylinder from the manufacturer or, worse than that, a hazardous condition on the highway. Understroking can lead to the ineffective and inefficient bleeding of gas from the cylinder.

The stroke indicator assembly 50 further comprises a slider 54 that movably mounts to the rod 30. A slider securing means 56 maintains the position of the slider 54 on the rod 30 during piston stroking. The slider 54 provides a visual stroke length reference to insure equal length strokes. The slider 54 is used in conjunction with the grooves or markings 52 to provide a visual gauging method for determining equal stroke length. As such, the user moves the slider 54 to the appropriate position on the push rod for providing the desired stroke length. The slider securing means 56 engages the groove 52 having the appropriate position and maintains the slider 54 at the appropriate position during piston stroking. Moreover, the slider securing means 56 can engage the push rod 30 between grooves 52 to maintain the position of the slider 54 between the grooves particularly when an uncommon master brake cylinder assembly is being stroked and a stroke length between the grooves 52 is desired.

The slider 54 can be constructed of aluminum, plastic, rubber or other material. The slider securing means 56 mounts the slider 54 to the rod 30 using mechanical or frictional means that maintain the position of the slider 54 relative to the rod 30 during stroking. The slider 54 is shown as disc-shaped with a rod channel 58. The slider 54 engages the rod 30 through the rod channel 58. As shown in FIG. 3, the slider securing means 56 includes a tap screw 60 that secures the position of the slider 54 relative to the rod 30 through a slider channel 62.

Figure 4B:
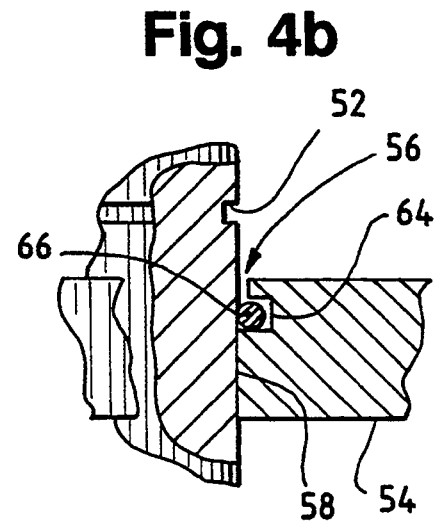

FIGS. 4a and 4b illustrate a preferred embodiment of the hand-held bleeder stroke tool 2 of the present invention. As previously mentioned, the handle 38 is molded to the push rod 30. The push rod 30 is shown with the stroke indicator assembly 50 including the grooves 52 to visually provide stroke length settings to the tool user. In addition, the bleeder stroke tool 2 is illustrated with the disc-shaped slider 54 that engages the push rod 30 through the rod channel 58 of the slider 54. As best seen in FIG. 4b, the slider securing means 56 includes a spring channel 64 about the rod channel 58. The spring channel 64 holds a C-spring 66 about the rod channel 58 to provide the means for securing the position of the slider 54. The slider 54 is set and maintained at a predetermined position by the C-spring 66 and one of the grooves 52 in the rod 30. For example, in FIG. 4b, if the slider 54 is moved in an upward direction such that the C-spring 66 engages the groove 52, the slider 54 is maintained at a setting determined by the groove 52. The position of the slider 54 is changed by simply forcing the slider 54 in a desired direction which disengages the C-spring 66 frown the groove 52. To bleed an uncommon master brake cylinder assembly having an atypical stroke length, the slider 54 can be moved to a position between the grooves 52, and the C-spring 66 still maintains the position of the slider 54 on the push rod 30 during piston stroking.

The bleeder tool user pumps or strokes the primary piston 20 with the bleeder stroke tool 2 using a stroke length according to the position of the slider 54 on the push rod 30. Usually, several strokes of the piston 20 are required to completely bleed the trapped gas. The user strokes the primary piston 20, preferably using equal length strokes determined by the position of the slider 54, until air bubbles stop appearing in the brake fluid reservoir 18. The absence of air bubbles in the brake fluid reservoir 18 signals the effective bleeding of the master brake cylinder.

Thus, the hand-held bleeder stroke tool 2 provides an effective, efficient, simple and inexpensive tool in the bleeding of gas from cylinder/piston assemblies. For example, the bleeder stroke tool 2 can effectively stroke a master brake cylinder assembly 4 using equal length strokes, as determined by the stroke indicator assembly 50, to prevent damaging the piston 20 during efficient bleeding of the cylinder assembly 4. Commonly, in bench bleeding a master brake cylinder assembly 4, damage to the cylinder/piston assembly 4 results from over stroking the piston 20 and also from attempting to stroke the piston 20 with a tool with sharp contact points, such as a screwdriver. The stroke indicator assembly 50 prevents over stroking, and the shape of the push member 36 distributes the applied force and eliminates a sharp point contact. Additionally, the hand-held nature of the bleeder stroke tool 2 increases its flexibility. The bleeder stroke tool 2 simply requires access to the piston 20, permitting the tool user to stroke the piston 20. In fact, if access to the piston is partially obstructed, the bleeder stroke tool 2 can still be used to effectively stroke the piston 20 by contacting the piston 20 with the push member 36 while the push rod 30 is at an angle relative to the movement of the piston 20.

What is claimed is:

1. A hand-held bleeder stroke tool for bleeding gas from a cylinder/piston assembly, said assembly having a cylinder and a primary piston disposed within said cylinder, said cylinder having an axial opening at one end, said piston having a first end portion exposed through said axial opening of said cylinder and a second end portion disposed within said cylinder, a fluid reservoir in communication with said cylinder, said bleeder stroke tool comprising:

a rod having a first end and a second end;

a push member positioned at said first end of said rod for engaging said first end portion of said primary piston;

a handle secured to said second end of said push rod; and a stroke indicator assembly comprising a plurality of markings along a length of said push rod to visually indicate a plurality of stroke length settings, each of said markings corresponding to a different one of said plurality of stroke length settings, said stroke indicator assembly further comprising a slider that is movably mounted on said push rod, said slider being positionable at any one of said plurality of stroke length settings to provide a tactile and visual indication of a stroke length corresponding to said any one of said stroke length settings to a user of said hand-held bleeder stroke tool during the bleeding of said cylinder/piston assembly.

2. The hand-held bleeder stroke tool of claim 1 wherein said push member is of spherical shape.

3. The hand-held bleeder stroke tool of claim 1 wherein said handle is secured to said second end of said push rod by a tap screw.

4. The hand-held bleeder stroke tool of claim 1 wherein said handle is molded to said push rod.

5. The hand-held bleeder stroke tool of claim 1 wherein said slider is movably mounted to said push rod by a tap screw.

6. The hand-held bleeder stroke tool of claim 5 wherein said slider is movably mounted to said push rod by a C-spring.

* * * * *